United States Patent
Bhattacharya et al.

(10) Patent No.: US 11,468,377 B2
(45) Date of Patent: *Oct. 11, 2022

(54) SYSTEM AND METHOD FOR CREATING A CENSUS HUB IN RESOURCE CONSTRAINED REGIONS

(71) Applicant: International Business Machines Corporation, Armonk, NY (US)

(72) Inventors: Kamal Bhattacharya, Nairobi (KE); Alan Kalton, Grabouw (ZA); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 310 days.

This patent is subject to a terminal disclaimer.

(21) Appl. No.: 16/458,161

(22) Filed: Jun. 30, 2019

(65) Prior Publication Data

US 2019/0325362 A1  Oct. 24, 2019

Related U.S. Application Data

(63) Continuation of application No. 15/058,290, filed on Mar. 2, 2016, now Pat. No. 10,929,786.

(51) Int. Cl.
  *G06Q 10/06* (2012.01)
  *G06Q 50/20* (2012.01)
(52) U.S. Cl.
  CPC ......... *G06Q 10/0631* (2013.01); *G06Q 50/20* (2013.01)
(58) Field of Classification Search
  CPC .......................... G06Q 10/0631; G06Q 50/20

USPC ............................................................ 703/6
See application file for complete search history.

(56) References Cited

U.S. PATENT DOCUMENTS

| | | | | |
|---|---|---|---|---|
| 6,173,153 B1 * | 1/2001 | Bittman | ................. | G07C 11/00 |
| | | | | 434/109 |
| 7,336,185 B2 * | 2/2008 | Turner | ................. | G06K 19/005 |
| | | | | 235/492 |
| 8,073,729 B2 * | 12/2011 | Kisin | ..................... | G06Q 10/04 |
| | | | | 705/7.29 |
| 8,353,705 B2 * | 1/2013 | Dobson | ................. | G09B 19/00 |
| | | | | 340/5.5 |
| 8,768,867 B1 * | 7/2014 | Thaeler | .................. | G06Q 30/02 |
| | | | | 706/12 |

(Continued)

FOREIGN PATENT DOCUMENTS

CN  2720524 Y  8/2008

OTHER PUBLICATIONS

Mishra et al. ("Student Attendance System Based On Fingerprint Recognition and One-to-Many Matching", National Institute of Technology Rourkela, 2011, India, pp. 1-87) (Year: 2011).*

(Continued)

*Primary Examiner* — Iftekhar A Khan
(74) *Attorney, Agent, or Firm* — Barak Cohen; Nick Cadmus; Lou Percello, Attorney, PLLC

(57) ABSTRACT

The disclosure provides systems and methods for generating attendance census models using data received from a network of automated census sensors as well as various additional secondary data sources. The models may be generated and used in real time to provide attendance predictions, to efficiently allocate resources, and to detect fraud, among many other uses.

20 Claims, 6 Drawing Sheets

(56) References Cited

U.S. PATENT DOCUMENTS

| | | | | |
|---|---|---|---|---|
| 9,021,056 B2* | 4/2015 | Dunn | H04L 67/306 | 709/217 |
| 9,053,185 B1* | 6/2015 | Liu | G06F 16/951 | |
| 9,195,998 B2* | 11/2015 | Den Herder | G06Q 30/0205 | |
| 9,218,468 B1* | 12/2015 | Rappaport | G06F 21/30 | |
| 9,426,627 B1* | 8/2016 | Logan | H04W 4/029 | |
| 9,648,464 B1* | 5/2017 | Tran | H04L 41/145 | |
| 9,715,695 B2* | 7/2017 | de Souza | G06Q 30/0202 | |
| 9,767,440 B2* | 9/2017 | Williams | G06Q 10/1095 | |
| 9,875,451 B2* | 1/2018 | Bostick | G06Q 50/01 | |
| 9,924,026 B2* | 3/2018 | Kenjalkar | H04W 76/38 | |
| 2002/0030582 A1* | 3/2002 | Depp | G07C 1/10 | 340/5.83 |
| 2002/0082897 A1* | 6/2002 | Menelly | G06Q 30/0205 | 705/7.34 |
| 2002/0107720 A1* | 8/2002 | Martin | G06Q 10/06314 | 705/7.34 |
| 2002/0178038 A1* | 11/2002 | Grybas | G09B 19/00 | 434/118 |
| 2002/0198760 A1* | 12/2002 | Carpenter | G06Q 30/02 | 705/7.34 |
| 2003/0167193 A1* | 9/2003 | Jones | G07C 1/10 | 705/32 |
| 2004/0003042 A1* | 1/2004 | Horvitz | G06Q 10/109 | 709/204 |
| 2004/0066276 A1* | 4/2004 | Gile | G07C 9/37 | 340/5.53 |
| 2004/0110119 A1* | 6/2004 | Riconda | G09B 7/02 | 434/350 |
| 2004/0162707 A1* | 8/2004 | Saint-Amour | G16Z 99/00 | 702/189 |
| 2004/0251304 A1* | 12/2004 | Carmon | G06K 17/0022 | 235/382 |
| 2005/0233294 A1* | 10/2005 | Keitch | G09B 19/00 | 434/350 |
| 2005/0244803 A1* | 11/2005 | Brown | G09B 5/14 | 434/350 |
| 2006/0035205 A1* | 2/2006 | Dobson | G07C 9/28 | 434/350 |
| 2006/0127870 A1* | 6/2006 | Fields | G09B 3/00 | 434/350 |
| 2007/0294124 A1* | 12/2007 | Crotts | G06Q 50/12 | 705/7.33 |
| 2008/0032719 A1* | 2/2008 | Rosenberg | G07C 9/27 | 455/466 |
| 2008/0040502 A1* | 2/2008 | Holsberry | G06Q 10/087 | 379/202.01 |
| 2008/0091471 A1* | 4/2008 | Michon | G16B 40/20 | 705/3 |
| 2008/0272905 A1* | 11/2008 | Higaki | G07C 9/38 | 340/539.11 |
| 2009/0299767 A1* | 12/2009 | Michon | G06Q 10/10 | 707/999.005 |
| 2011/0208674 A1* | 8/2011 | Mills | G06Q 50/30 | 705/500 |
| 2011/0295712 A1* | 12/2011 | Browning | G06Q 30/0633 | 705/26.8 |
| 2012/0116789 A1* | 5/2012 | Boss | G06Q 10/06 | 705/500 |
| 2013/0101234 A1* | 4/2013 | Den Herder | G06Q 50/16 | 382/286 |
| 2013/0179357 A1* | 7/2013 | Den Herder | G06Q 30/0206 | 705/306 |
| 2014/0074896 A1* | 3/2014 | Bushman | G06Q 50/20 | 707/805 |
| 2014/0159858 A1* | 6/2014 | Bianco | G07C 9/27 | 340/5.6 |
| 2014/0278031 A1* | 9/2014 | Scofield | G08G 1/096741 | 701/118 |
| 2014/0279610 A1* | 9/2014 | Hendrix | G06Q 30/018 | 705/317 |
| 2014/0358647 A1* | 12/2014 | Jeffrey | G06Q 10/00 | 705/12 |
| 2015/0095056 A1* | 4/2015 | Ryan | G16H 50/70 | 705/2 |
| 2015/0120362 A1* | 4/2015 | Whorley, Jr. | G06Q 50/205 | 705/7.19 |
| 2015/0186957 A1* | 7/2015 | Barr | G06Q 30/0281 | 705/346 |
| 2015/0254580 A1* | 9/2015 | Gupta | G06Q 10/02 | 705/5 |
| 2015/0294274 A1* | 10/2015 | Williams | G06Q 10/1095 | 705/7.19 |
| 2015/0312872 A1* | 10/2015 | Liang | H04W 84/045 | 455/435.1 |
| 2015/0379654 A1* | 12/2015 | Deshmukh | G06Q 50/205 | 705/326 |
| 2016/0048785 A1* | 2/2016 | Dommarajukrishnamaraju | G06Q 10/06313 | 705/7.23 |
| 2016/0078573 A1* | 3/2016 | Den Herder | G06Q 30/0205 | 705/7.34 |
| 2016/0125354 A1* | 5/2016 | Kang | G06Q 10/087 | 705/28 |
| 2016/0302034 A1* | 10/2016 | Sophinos | H04W 4/021 | |
| 2016/0350721 A1* | 12/2016 | Comerford | H04L 67/306 | |
| 2017/0083925 A1* | 3/2017 | Wang | G06Q 30/0201 | |
| 2017/0200105 A1* | 7/2017 | Bassinder | G06Q 10/06315 | |
| 2017/0256109 A1* | 9/2017 | Bhattacharya | G06Q 10/0631 | |
| 2018/0025371 A1* | 1/2018 | Perriman | G06Q 10/02 | 705/7.31 |

OTHER PUBLICATIONS

Mishra et al. ("Student Attendance System Based On Fingerprint Recognition and One-to-Many Matching", thesis,National Institute of Technology Rourkela, India, 2011, pp. 1-87).*

Mittal et al. ("Fingerprint Biometric based Access Control and Classroom Attendance Management System", IEEE, 2015, pp. 1-6).*

Beny'o et al. ("Student attendance monitoring at the university using NFC", IEEE, 2012, pp. 1-5).*

Mishra et al. (Student Attendance System Based On Fingerprint Recognition and One-to-Many Matching, 2011, National Institute of Technology Rourkela, pp. 1-87) (Year: 2011).*

Mittal et al. (Fingerprint Biometric based Access Control and Classroom Attendance Management System, IEEE, 2015, pp. 1-6) (Year: 2015).*

Mishra et al. ("Student Attendance System Based On Fingerprint Recognition and One-to-Many Matching", thesis, Nation institute of Technology Rourkeia, India, 2011, pp. 1-87.

Mittal et al. ("Fingerprinting Biometric based Access Control and Classroom Attendance Management System", IEEE. 2015, pp. 1-6).

* cited by examiner

SYSTEM AND METHOD FOR CREATING A CENSUS HUB IN RESOURCE CONSTRAINED REGIONS

CROSS-REFERENCE TO RELATED APPLICATION

This application is a continuation of U.S. patent application Ser. No. 15/058,290 to Bhattacharya et al. filed on Mar. 2, 2016.

FIELD OF THE INVENTION

In embodiments, the technical field of the invention is attendance modelling, prediction, and alert systems and methods.

BACKGROUND

Governments, donors and NGOs continue investing on education transformation efforts across developing countries. They are driven by the demand for transparent and efficient resource allocation and utilization at all levels of school systems. As part of this transformation is the emergence of relatively primitive school attendance monitoring and forecasting systems. Data is reported and collected through a combination of various manual tools such as in-class attendance sheets, logbooks, house-to-house surveys, random observations using mobile-based tools, etc. Data verification and aggregation is carried out at a higher-level using ad-hoc means. Resources (e.g., inventories, teacher support systems) are allocated and distributed to individual schools in a top-down approach informed by inconsistent, incomplete, and un-reconciled data. Fine-grained schools census data is desirable to infer student attendance patterns over a time period, to detect fraud, to infer school effectiveness and popularity, to enable tractability, to monitor transparency and accountability of school systems, and to support more robust methods of resource allocation. Such monitoring is particularly desirable for education delivery in communities who are in-move (e.g., nomadic and pastoralist groups), where students are subject to informal and inconsistent education experience, and where school attendance has traditionally been limited.

While schools have long experimented with attendance monitoring and forecasting for planning and assessing the viability or success of progression, many government schools lack reliable method for collecting and monitoring their student attendance. Furthermore, little is known about students with disabilities and their school attendance patterns. These situations are common in emerging markets like Africa and India. It is common for decision makers to have access to various attendance data sources, which may require tedious back-and-forth manual investigation/analysis. Moreover such data are mostly available in non-digital forms, which are also reported to be incomplete, error-prone, and raised a number of questions on data quality and transparency. As a result, school-level attendance forecasting and prediction in resource-constrained environments solely rely on limited types of input data. Furthermore current analytics models do not scale across different data sources, including data outside of school system, e.g., weather data, healthcare data, socio-economic data, and "soft" data. These models are also not configured to integrate data in real-time to facilitate dynamic evaluation (e.g., real-time census counting, fraud detection, etc.). Moreover they will not provide accurate, transparent and traceable insights. Methods for addressing the above issues are therefore desirable.

SUMMARY OF THE INVENTION

In an aspect is a computer system, comprising: a processor; and a memory coupled to the processor, the memory configured to store program instructions executable by the processor to cause the computer system to: receive attendance census data from an attendance census gathering sensor about a venue remotely located with respect to the computer system, and store the received attendance census data in a census hub, wherein the attendance census gathering sensor is coupled to an embedded unit configured to dynamically annotate the attendance census data with pre-defined metadata values; receive non-census secondary data from a secondary data source and store the received secondary data in the census hub; correlate the secondary data with the attendance census data; generate an attendance forecast for the venue based, at least in part, on the census hub; and generate a notification based on the attendance forecast. In embodiments:

the computer system is further configured to generate an attendance model, and wherein the attendance forecast is part of the attendance model;

the notification is transmitted to a user device, and wherein the notification includes an instruction or a request for instructions from the user;

the notification is transmitted to a user device, and wherein the notification includes an instruction or a request for instructions from the user, and wherein the transmitted notification provides an interactive platform to receive user input;

the computer system is further configured to receive attendance census data from a plurality of attendance census gathering sensors about a plurality of venues remotely located with respect to the computer system;

the census hub is a database configured to store historical census data from a plurality of venues;

the notification is selected from an alert (SMS, email, screen alert, intra-program message, etc.) and a requisition order (water delivery, food delivery, etc.);

the notification is transmitted via a network to a user device or is displayed on a user device;

the notification is selected from an alert and a requisition order, and the notification is transmitted via a network to a user device or is displayed on a user device;

the secondary data source is a sensor, a social media network, a website, a manual input device, or a secondary database, and wherein the secondary data is selected from a weather report, a website usage report, a health report, an attendance report, and a news report;

the secondary data is correlated with the attendance census data based on a correlation factor selected from a time factor, a location factor, and an identity factor;

the attendance census gathering sensor is a camera, fingerprint reader, ID scanner, or motion sensor, and wherein the attendance census data is selected from a photograph, an ID number, and a biometric indicator;

the processor is configured to extract, analyze, and characterize features from the attendance census data, and to align the features with user-supplied metadata and context information;

the census hub is a database configured to store historical census data from a plurality of venues, and wherein the computer system is further configured to generate an attendance model, and wherein the attendance forecast is part of the attendance model.

the computer system is further configured to receive attendance census data from a plurality of attendance census gathering sensors about a plurality of venues remotely located with respect to the computer system; the secondary data source is a sensor, a social media network, a website, a manual input device, or a secondary database; and the secondary data is selected from a weather report, a website usage report, a health report, an attendance report, and a news report; and the secondary data source is a sensor, a social media network, a website, a manual input device, or a secondary database, and wherein the secondary data is selected from a weather report, a website usage report, a health report, an attendance report, and a news report, and wherein the secondary data is correlated with the attendance census data based on a correlation factor selected from a time factor, a location factor, and an identity factor.

In an aspect is a method comprising: receiving, by a computer system via a network, attendance census data from an attendance census gathering sensor about a venue remotely located with respect to the computer system, and storing the received attendance census data in a census hub, wherein the attendance census data is dynamically annotated with predefined metadata values by an embedded unit; receiving, by the computer system, non-census secondary data from a secondary data source and storing the received secondary data in the census hub, correlating the secondary data with the attendance census data; generating an attendance forecast for the venue based, at least in part, on the received attendance census data and received secondary data; and generating a notification based on the attendance forecast. In embodiments:

the method further comprises receiving attendance census data from a plurality of attendance census gathering sensors about a plurality of venues remotely located with respect to the computer system and generating an attendance model, and wherein the attendance forecast is part of the attendance model;

the census hub is a database configured to store historical census data from a plurality of venues, and further comprising generating an attendance model, wherein the attendance forecast is part of the attendance model; and the secondary data source is a sensor, a social media network, a website, a manual input device, or a secondary database, and wherein the secondary data is selected from a weather report, a website usage report, a health report, an attendance report, and a news report, and wherein the secondary data is correlated with the attendance census data based on a correlation factor selected from a time factor, a location factor, and an identity factor.

In an aspect is a system comprising: a processor; a memory coupled to the processor, the memory configured to store program instructions executable by the processor to carry out the method as above; and an attendance census gathering sensor located remotely from the processor and in communication with the processor via a network. In embodiments:

the attendance census gathering sensor is one of a plurality of sensors in a networked set of attendance census gathering sensors.

In an aspect is a networked census structure comprising: a server comprising a processor and a memory coupled to the processor; and a networked set of attendance census gathering sensors, wherein each attendance census gathering sensor in the set of attendance census gathering sensors is in data communication with the server, and wherein the memory is configured to store program instructions executable by the processor to cause the server to: receive attendance census data from the set of attendance census gathering sensors; receive non-census secondary data from a secondary data source, process the attendance census data and secondary data to generate an attendance model. In embodiments:

the processor is configured to receive a request from a user and provide an output based on the request and the attendance model.

These and other aspects of the invention will be apparent to one of skill in the art from the description provided herein, including the examples and claims.

DETAILED DESCRIPTION OF VARIOUS EMBODIMENTS

Figure 1:
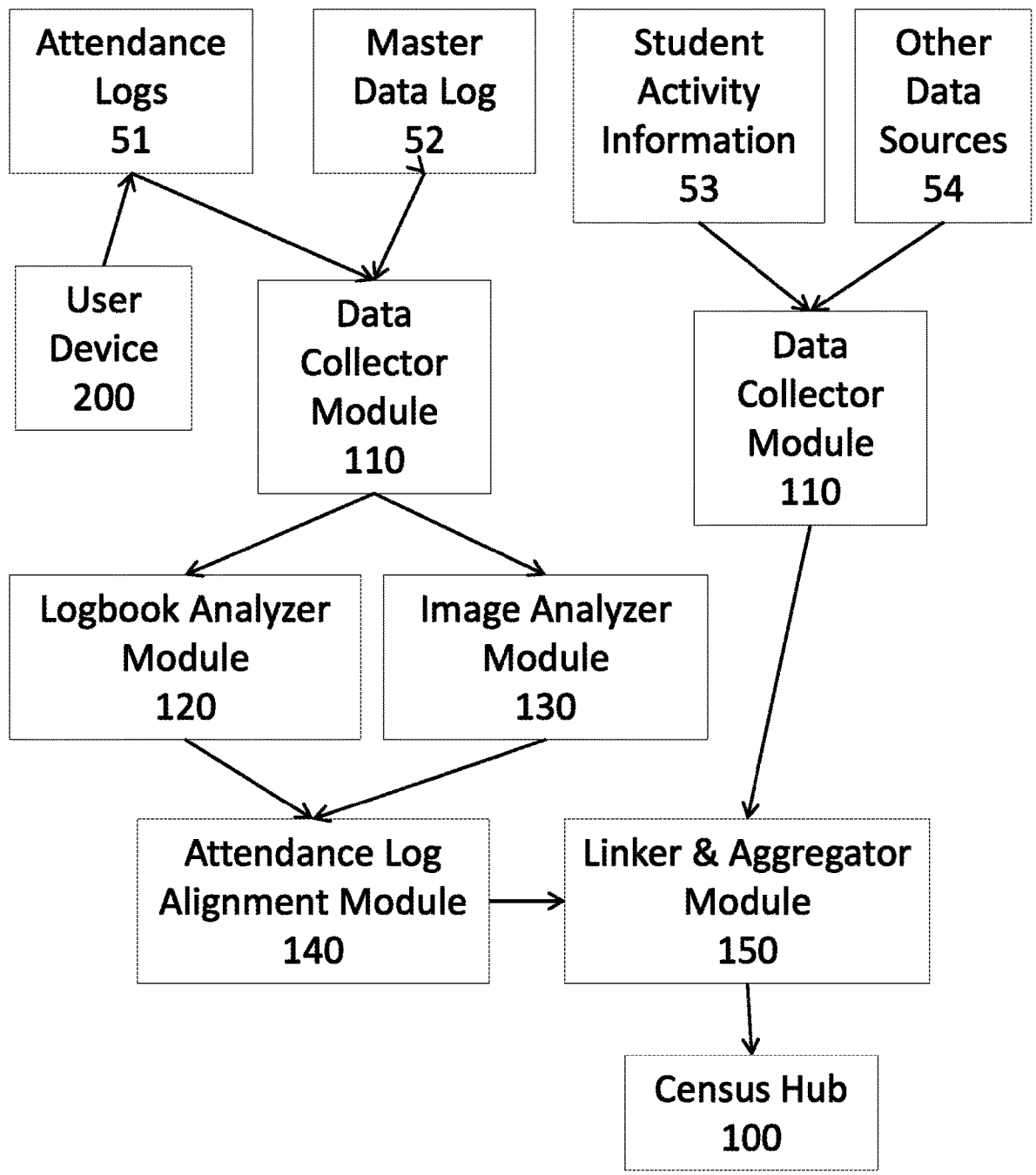
FIG. 1 provides a flowchart including operations and components providing data to a census hub according to an embodiment of the disclosure.

Throughout this disclosure, student attendance census data will be used as exemplary, although such use is merely for the sake of convenience in describing the invention, and is not intended to be limiting. A variety of uses are disclosed herein, and the disclosure provided with respect to student attendance census data is equally applicable to such alternative uses (unless indicated otherwise or obvious from the context).

In an aspect is provided a computer system and various methods for using the system. The system comprises a processor and a memory coupled to the processor, the memory configured to store program instructions executable by the processor. Such instructions will be sufficient to cause the computer system to carry out the methods described herein. The processor and memory together are parts of a server, wherein the term "server" is meant to include any combination of processor and memory capable of carrying out the methods disclosed. Thus the server could be, in embodiments, a traditional server, personal computer, mobile device (e.g., laptop, tablet, smartphone, etc.) or the like. The server will further comprise necessary and/or beneficial peripheral devices, I/O devices, storage devices, and the like, in order to carry out the disclosed methods.

In embodiments the computer system is in data connection with a network. The network may comprise, for example, the Internet, a local area network, a wide area network, a cellular network, or any other type of network known in the art. A combination of such networks can also be used by the computer system. The computer system will comprise any components that are necessary to send and receive information via the network, such as a network card, LAN port, GSM network interface (e.g., a SIM and transceiver circuitry), WiFi interface, and the like, as appropriate. Such networks allow the computer system to communicate with other components that may be necessary to carry out the disclosed methods, such as the sensors and I/O devices described herein.

In embodiments the computer system is configured (i.e., the memory comprises program instructions suitable to cause the computer system) to receive attendance census data from an attendance census gathering sensor.

The attendance census gathering sensor is coupled to the computer system in order to facilitate the upload of attendance census data as will be described. In embodiments, the attendance census gathering sensor may be coupled to a client using a suitable interface such as, for example, a serial interface, a universal serial bus (USB), a parallel interface, wireless interface, or any other appropriate interface facilitating communication between the attendance census gathering sensor and the client. Alternatively, the attendance census gathering sensor may be directly in communication with the computer system, e.g., via a GSM network, the Internet, or the like. The attendance census gathering sensor is employed to capture census data, for example of students in a class as proof that the students were in attendance at the time the data was obtained. In this respect, the attendance census gathering sensor may comprise any device that obtains appropriate personal identification data from the students such as, for example, a magnetic stripe reader, a camera, a fingerprint reader, a ID scanner, a motion sensor, a radio frequency identification device (RFID), a biometric data reading device, or another device. In one example, the attendance census gathering sensor may comprise, for example, any one of a number of cameras that are currently commercially available from various manufacturers.

Where the attendance census gathering sensor is in communication with a client, the sensor gathers census data and then transmits the data to the client, either for temporary storage by the client or to be relayed to the computer system. Where the attendance census gathering sensor is in direct communication with the computer system, the sensor may temporary locally store sensor data for later transmission, or may provide real-time sensor data directly to the computer system. For example, where the attendance census gathering sensor is a camera, the camera may be a web cam that transmits real-time data to the computer system. Alternatively or in addition, the attendance census gathering sensor may be a webcam with resident memory suitable to store sensor readings, e.g., during a network outage. The stored sensor readings can be transmitted at such time as the network is restored.

The attendance census gathering sensor records and transmits attendance census data. The nature of such census data will depend on the type of sensor. Some examples include a photograph, an ID number, and a biometric indicator. The photograph may be of a face (thereby potentially requiring facial recognition software in the computer system or elsewhere) or some other personal identifying feature (e.g., a photo of an ID card, barcode, logbook, or the like). The photograph is digital and may therefore also be referred to as a scan. Photographic (or scanned) data may further include any digital means at capturing the same information (e.g. using a scanner or the like). An ID number can be a student ID number or a number assigned by the computer system explicitly for the purposes of the methods described herein. Such ID number can be encoded in a bar code or magnetic stripe or the like, and can be read automatically by an appropriate reader. A biometric indicator may be, for example, a fingerprint, retinal scan, facial scan, voiceprint, or the like. A fingerprint can be read by any appropriate fingerprint recognition sensor and can be from any suitable finger/thumb. The term "fingerprint" is also meant to include palm prints and any other unique skin impression or image. Similarly, facial scans and other biometric indicators can be measured with appropriate sensors.

The attendance census data may be augmented (or, in some situations, replaced entirely) by digital attendance data such as digital logbooks and teacher records. In some circumstances, such as for creating a greater historical record of data, it may be necessary to capture analog records such as by scanning.

The attendance census data may be identification data or may be anonymous data, or a combination thereof. Identification data includes any data that specifically identifies a subject, such as an ID number or biometric data. This data may be cross referenced with a database of subjects (e.g., students), in order to identify specific subjects measured by the sensor). Anonymous data provides information about the number or nature of subjects that are measured, but does not provide data that can specifically identify a subject. Examples include the number of people in an image, the number of times there is motion within range of the sensor, and the like. Anonymous data may be easier to obtain and may require less expensive sensors and software, and may therefore be desirable in certain situations, particularly where specific identification of subjects is unnecessary. For example, motion sensors based on detection of movement in the infrared or visible light spectra are readily available and may be suitable in some cases.

The attendance census gathering sensor records and transmits attendance census data about a venue remotely located with respect to the computer system. The venue may be, for example, a remote classroom or school entrance. Generally the attendance census gathering sensor will be present in a strategic place within the venue in order to appropriately capture all desirable data. In embodiments the sensor may be located in a fixed position, such as above a doorway or at the front of a classroom. Alternatively the sensor may be movable such as a webcam attached to a computer or as a detachable peripheral device for a computer.

A plurality of attendance census gathering sensors may be incorporated to provide census data to the computer system. The sensors may be located within a single school, such as to obtain data for a plurality of classrooms. Alternatively or in addition, the sensors may be located at different schools, so as to obtain data for a plurality of schools. In embodiments is provided a networked set of attendance census gathering sensors. Such networked set provides attendance census data over a range of venues, for example for schools (all or a representative sample) in a specific town, or for schools in a county, or for schools in a district, or for schools in a region, or for schools countrywide.

In embodiments, the attendance census gathering sensor is coupled to an embedded unit configured to dynamically annotate the attendance census data with predefined metadata values. The embedded unit may be directly attached to the attendance census gathering sensor. Alternatively or in addition, the embedded unit may be part of the client to which an attendance census gathering sensor is attached. A variety of metadata may be obtained in any suitable combination; examples of metadata include a time stamp, a location, a local weather factor (e.g., temperature, humidity, barometric pressure, etc.), an audio recording, or other data as appropriate.

The census data, once obtained, is directly or indirectly relayed to the computer system. Direct relay occurs when the attendance census gathering sensor is in direct communication with the computer system, whereas indirect relay occurs when the attendance census gathering sensor is associated with a client, and the client communicates the data to the computer system. The computer system receives the data via the network and then stores the data in a census hub. The census hub is a database containing census data. In embodiments, the census hub is a database configured to store historical census data from a plurality of attendance census gathering sensors. In embodiments the census hub is configured to store historical census data from a plurality of venues. In embodiments the census hub is configured to store historical census data from a plurality of attendance census gathering sensors and a plurality of venues. Each piece of data (or a predetermined subset of data) sent to and stored in the census hub may be accompanied/tagged by associated metadata, such as the metadata described herein.

In addition to data from the attendance census gathering sensor, the computer system is configured to receive non-census secondary data from a secondary data source. The secondary data is received from a secondary data source, which may be a sensor, a social media network, a website, a manual input device, or a secondary database, or another source of data. The type of data that is obtained as secondary data will depend on the source of the secondary data, and may include sensor data (e.g., movement data, weather data, etc.), weather reports (e.g., historical weather data and weather forecasts), website usage report (e.g., general Internet usage and/or usage of particular websites), health reports (including historical health data and health forecasts), geo-position data socio-economic or "soft" data, an attendance report (e.g., teacher attendance data), social network data, and a news report. As with the census data, the secondary data may also be accompanied with appropriate metadata such as a time stamp, a location stamp, etc. The secondary data source may be located within a venue (i.e., a venue containing an attendance census gathering sensor.

Once secondary data (and any accompanying metadata) is received, the computer system is configured to store the received secondary data (and accompanying metadata) in the census hub. The computer system may further be configured to correlate the received secondary data with attendance census data. Such correlation may be with attendance census data received previously, or with attendance census data received concurrently, or with attendance census data received after the secondary data is received, as appropriate. The correlation is based on a correlation factor (or a plurality thereof), such as a correlation factor selected from a time factor, a location factor, and an identity factor. The correlation may be achieved, for example, by providing a pointer with the census hub database such that a particular attendance census data and a particular secondary data are linked and can be accessed together by the computer system.

The computer system may further comprise program instructions suitable to create an attendance model. The attendance model is based at least in part on the census hub (i.e., the data within the database that forms the census hub). In embodiments, the attendance model is formulated based on the attendance census data alone. In embodiments, the attendance model is formulated based on the attendance census data and associated secondary data. The attendance model may further account for a variety of tertiary data.

Tertiary data may be stored in the census hub or may be stored elsewhere and accessed by the computer system when necessary. Tertiary data may be specific to a venue (e.g., to a specific school), or may be specific to a group of venues (e.g., to all schools within a district or town). Tertiary may be tagged with appropriate metadata, but is not necessarily associated with metadata. Examples of tertiary data include data relating to resources that are available per school (or resources that are available per student), historical school profile data (e.g., performance data of a school or students at that school), historical fraud data (e.g., specific or general instances of fraud, rates of fraud, etc.), neighbourhood statistics (e.g., crime rates, rates of government assistance or public housing, etc.), and the like. The attendance model is a general model that applies to a school, or to a group of schools (e.g., a district, or schools within a city, etc.). In embodiments the attendance model is able to show attendance and other factors over a time scale that includes past events and future predictions. Thus, the model will improve over time, as more data is acquired and added to the census hub. Known descriptive, prescriptive and/or predictive learning algorithms are used to generate and update the models. These algorithms can be text, image or cognitive centric algorithms.

In embodiments, the attendance model can be used to generate an attendance forecast. The attendance forecast may apply to a venue, where the venue may be a subset of students within a school (e.g. all students in a specific class, or in a specific grade level, or having a shared characteristic, etc.), a school as a whole, or a group of schools. The attendance forecast may be for a specific date or a range of dates, such as for a specific week, or a month, or a school year. The attendance forecast may, for example, predict the level of attendance of a specific group of students over a specific period of time. The attendance forecast can be conditional—i.e., the forecast can provide a variety of possible outcomes based on the occurrence or non-occurrence of an event. The predictive nature of the attendance forecast is limited primarily by the quality and quantity of input data (attendance census data, secondary data, and tertiary data). Further examples of attendance forecasts are provided herein.

In embodiments, the attendance forecast is generated based on a user request. The user, for example a user interfacing directly with the computer system or indirectly via a client, may initiate a request by specifying the desired forecast (e.g., scope of geographic coverage, scope of chronologic coverage, scope of students encompassed by the forecast, etc.). Such request can be facilitated by a suitable user interface that allows the user to input the desired variables or prompts the user for certain variable input.

Once the computer system creates an attendance forecast, the computer system can further generate a notification based on such forecast. The notification is suitable to instruct a user (i.e., a user that initiated the attendance forecast and provided the defining parameters) or a third party to take (or not to take) a specific action in order to improve a situation. In embodiments, the notification is selected from an alert and a requisition order. Where the notification is an alert, the format of the notification can be SMS, email, screen alert, intra-program message, or any other suitable medium. An alert can be directed to a specific individual, such as the principal of a school or the director of a school's food services. In embodiments, the alert notifies the recipient of a pending situation regarding attendance at the school. Such situation may be a predicted spike in attendance, or a spike in absenteeism, or a longer-term drop in attendance, or a predicted shortfall of water or another resource at the school. Where the notification is a requisition order, the notification can be sent directly to the relevant supplier. Examples include water delivery, food delivery, delivery of books or other school supplies, and the like.

In addition to the computer system and associated components described herein, the invention includes methods for using such systems and components. For example, in embodiments, the invention includes a method comprising receiving, by a computer system via a network, attendance census data from an attendance census gathering sensor about a venue remotely located with respect to the computer system, and storing the received attendance census data in a census hub, wherein the attendance census data is dynamically annotated with predefined metadata values by an embedded unit; receiving, by the computer system, non-census secondary data from a secondary data source and storing the received secondary data in the census hub; correlating the secondary data with the attendance census data; generating an attendance forecast for the venue based, at least in part, on the received attendance census data and received secondary data; and generating a notification based on the attendance forecast.

Accordingly, in embodiments described herein there is provided a framework for effective analysis, characterization, and prediction of attendance in public school networks while enabling transparent and fair allocation and distribution of school-level resource.

In embodiments described herein there is provided a method for creating and continuously updating attendance census data, a "nation-wide" connected school Census Hub (CH) for attendance monitoring and forecasting historical student attendance data (including image, voice, fingerprint, logbook, etc.) collected over a time period with linked and summarized data from, such as, weather data, health record data, geo-position data socio-economic or "soft" data, social network data, teacher attendance data, etc. Further is an interface of the CH with real-time student activity steam data (i.e., SAI) gathered from one or more blend digital learning environments (e.g., mEduPAL).

Further is provided methods for creating and continuously updating predictive and cognitive attendance census models, generating an initial attendance forecast for a school using a historical attendance prediction model and historical data from linked CH. Further is provide a method for creating a real-time attendance prediction model for individual classes or schools based, at least in part upon the initial attendance forecast and real-time data (e.g., real-time image, weather data, teacher absenteeism predicators, etc.). Further is provided methods for generating a dynamic resource estimation and forecasting models for decision makers by enabling dynamic fraud detection and end-to-end feedback mechanisms. For example these effects are provided by various client-side data collection engines, backend enablement and analytics components as described herein.

Further there is provided systems and methods for creating and updating attendance census data. In embodiments are multiple units that extract, analyze and characterize features from the collected attendance data of varied form (such as image, voice, RFID, fingerprint, or logbook), and then align with user-supplied metadata and context information. In embodiments is a linker module that progressively constructs the initial census hub based on a plurality of datasources to generate and update the census hub for data consumers, e.g., government organizations and donors.

In embodiments is a novel networked census hub structure and associated functions that contains a wide range of operations (e.g., count, summarization, time-series, etc.) pertaining to a data consumers request with a different level of specificity based on time and geo-location in a privacy-preserving manner. The invention includes multiple source validation based on a plurality of datasources.

In embodiments is a system and method for forecasting and predicting school census from the census hub based on similarity patterns with overall observation of historical census data (linked with plurality of datasources). Further is included a comparison with historical data with respect to a single student or classroom or school or group of schools. Such methods allow estimating individual student resource affinity.

Furthermore, such systems include the method of forecasting and predicting resource needs to individual schools, and further includes automatic fraud detection by employing various probabilistic algorithms to optimally and transparently allocate resources.

The inventive methods enable clustering, profiling, and benchmarking of schools using the data collected. Methods for doing such analyses are well known in the art, and are improved based on the enhanced data set provide by the census hub.

Data collection includes a user interface that implements a set of mobile/tablet/sensor applications integrated with customizable conventional image recognition, biometric identification, voice-based identification, or automated logbook recording. The invention further leverages frugal innovations (e.g., low-density camera and cost effective processing units like Raspberry Pi) to supplement the data capturing and online/offline streaming activities. The data collection may further receives student-level or group-level attendance logs on regular or random sampling basis through the user interface from multiple classrooms (of the same school or different school) simultaneously; while annotating each log entry with predefined meta data (e.g., context, events, places, etc.). The invention further includes analyzer engines (also referred to herein as an image analyser module, logbook analyser module, etc) that retrieve features (e.g., time, location, lesson, light intensity) and context from the images and logbook records of each attendance log, as well as decode RFID ID. The image/voice analyzer may further quickly and accurately analyze and detect over-aged or under-aged students from the image/voice content based on user-specified context information (e.g., class). This helps to identify fraudulent situations in the classroom(s).

In embodiments is an attendance alignment system (also referred to herein as an attendance log alignment module) that matches and aligns the analyzed logs (i.e., images, voices, texts, RFID IDs, etc.) to school metadata at geo-temporal, context level, or combinations thereof to form student-level attendance census (i.e., the census hub). Upon reception of an analyzed logs, the system may further retrieve previous observation logs for the same user from the census hub and re-organize the matching and aligning to sequence logs e.g., in time-series order.

Furthermore, in the described systems, additional data may be gathered automatically from student activity stream data (i.e., SAI) and additional corpus collected by a data engine, such as, by interfacing with conventional method (e.g., ETL) and data curating techniques. A linker and aggregator module may be employed to ensure that all such data is properly tabulated, correlated, and linked to appropriate metadata and other data.

In embodiments, the census hub may be divided as follows. Primary data (i.e., as collected using the methods disclosed herein) are referred to as a first attendance census log. Given data from a data engine, the invention includes a linker & aggregator engine (i.e., the linker and aggregator module) that applies multiple aggregation technique progressively on the first attendance census log to digitally organize narrative information across different school metadata (such as course, teacher, grade, school, district, county, etc.) to form the second attendance census hub. The invention may further condition the first attendance census hub by inserting a context and associated environment-rich data. Then, the second attendance census hub can be combined with the first attendance census log to form the final attendance census hub. On the final census hub, the invention allows determination of how information systems might better support the expression of multiple perspectives of operations and their relationships with events derived, e.g., from teacher attendance pattern, weather forecast, healthcare patterns, student activity stream, etc.

In embodiments, the invention allows a comprehensive summary of a classroom attendance distribution over a period of time and to organize images based on temporal/spatial values from the logs per student, per class, per school, etc. In embodiments, the invention allows clustering of students based on attendance log data from the census hub—e.g., of similarity of attendance patterns of the same demography, socio-economic indicators, as well as other features such as performance.

In embodiments, there is provided more effective predictors through analysis of the census hub and other datasources. For example: measurement of student-environment alignment; measurement of student-teacher affinity (affinity between a teacher and a student or group of students); and an ability to group students based on resources, demography, interest etc.

The invention further allows generation of holistic school profile model-distribution of attendance, school resources, performance of a set of students in comparison to the distribution of historical attendances in the same class or subject, etc.

In an embodiment is a method for classroom attendance tracking, comprising: obtaining personal identification data from each one of a plurality of students attending a class using a attendance census gathering sensor, establishing data communication between the attendance census gathering sensor and a server or a client coupled to a server via a network; and automatically uploading the personal identification data from the attendance census gathering sensor to the server. The personal identification data is added to a census hub and is then subjected to the methods described herein.

Output from the methods and systems described herein are generally sent to and displayed on monitors (e.g., phone screens, computer monitors, and the like), and, in embodiments, enable and encourage interactivity with a user. The user is allowed to: view the various attendance models created by the system, as well as analysed data pertaining thereto; input simulation data to observe predicted variations in attendance patterns; select different methods of viewing data such as graphs, charts, figures, raw data, etc.; place orders based on alerts generated by the system (e.g., requisition of additional resources—either commodity or human—based on attendance predictions, etc.); issue notifications and alerts to others based on attendance predictions; and the like. In some embodiments, the alert may be replaced with or accompanied by an automatic initiation of an event or action. Examples include an automatic placement of a requisition order, or automatic notification of additional human or non-human resources needed, or automatic reduction of water or electrical power supplied to a building or room, or the like. As a specific example, the alert may notify a user that supplies have automatically been requisitioned due to anticipated/predicted changes in attendance. The alert may automatically initiate a separate system for monitoring and/or controlling resources within a venue, such as a water system monitoring unit or a water reclamation system, or the like.

In addition to schools, the venue may be selected from, for example, nursing homes, banking facilities, retailer outlets (e.g., to provide shopper data, patterns of use, engagement, or to provide personalized advertising to shoppers, or to provide credit card fraud protection), political events or voting, amusement parks (e.g., for ride tracking/utility/planning), and the like.

Notwithstanding the above, in the following descriptions of figures and throughout this disclosure, the example of a school census hub is provided/used, although such use is solely for the purpose of convenience in explaining and exemplifying the invention. Such use of a school census hub is not to be taken as limiting, and the disclosure provided is applicable to the other uses described herein.

Referring now to FIG. 1, components of a system according to an aspect of the invention are shown. User device 200 is used to provide attendance data in the form of attendance logs 51. As mentioned herein user device can be any mobile device such as a phone or tablet, or a desktop or laptop computer, or the like. The attendance logs may take the form of image or fingerprint scans, digital logbooks, RFID signals, or the like. A school then provides data in the form of a master data log 52. Such data may include lists of enrolled students, teacher and other employee lists, courses offered, schools and departments present, the county or location in which the school is located, etc. Such data (along with attendance logs 51) are provided to a data collector module 110. Such data are also referred to as school metadata, and can also be sent directly to the Attendance Log Alignment Module 140 (connection not shown). The data collector module 110 also receives data from student activity information 53. The data collector module 110 also receives data from other data sources 54. Data collector module 110 therefore receives data from a plurality of sources, and then has several options for passing the data. Some data, particularly logbook data, may be passed to a logbook analyser module 120. Such module extracts relevant data or interprets data for further processing downstream. Other data may be passed to an image analyser module 130. Such module may, for example, use biometric analyses methods (e.g., facial recognition, etc.) or other techniques to extract relevant data and/or interpret the data for further processing. The output from logbook analyser module 120 and from image analyser module 130 is passed to an attendance log alignment module 140. This module ensures that data is properly tabulated and linked to other data, metadata, and the like. The output from attendance log alignment module may be, for example, fully analysed and fully tabulated and cross-referenced attendance records for a class, or a school, or another entity. This output can then be sent to a linker and aggregator module 150, which also receives data directly from data collector module 110. Linker and aggregator module 150 further ensures that data received from various sources are properly linked, tabulated, and associated. The output of linker and aggregator module 150 is sent to the census hub 100. Census hub 100 is the database described herein for monitoring and analyzing attendance data from various sources about various venues (e.g., attendance monitoring and forecasting historical student attendance data).

Figure 2:
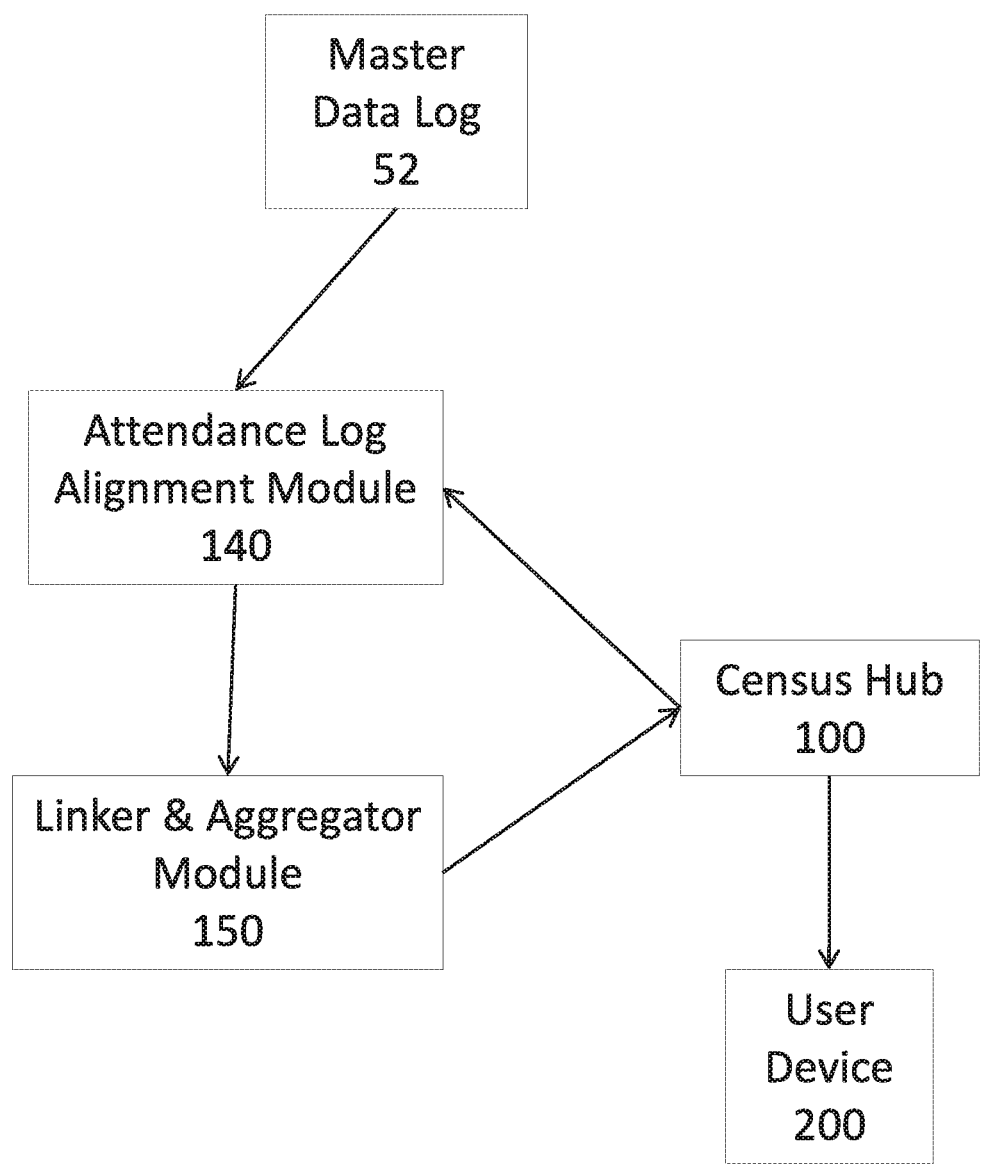
FIG. 2 provides a flowchart including operations and components involving a census hub according to an embodiment of the disclosure.

Referring to FIG. 2, further connectivity surrounding census hub 100 is provided. Master data log 52 provides data directly to attendance log alignment module 140, which is in communication with linker aggregator module 150. Census hub 100 receives data from linker and aggregator module 150 and further sends data and inquiries and the like to attendance log alignment module 140. Census hub 100 also communicates directly with user device 200. Such communication may be two way (although one-way is shown in FIG. 2) and may include delivery of graphs or other representations of data, predictions, and the like.

Figure 3:
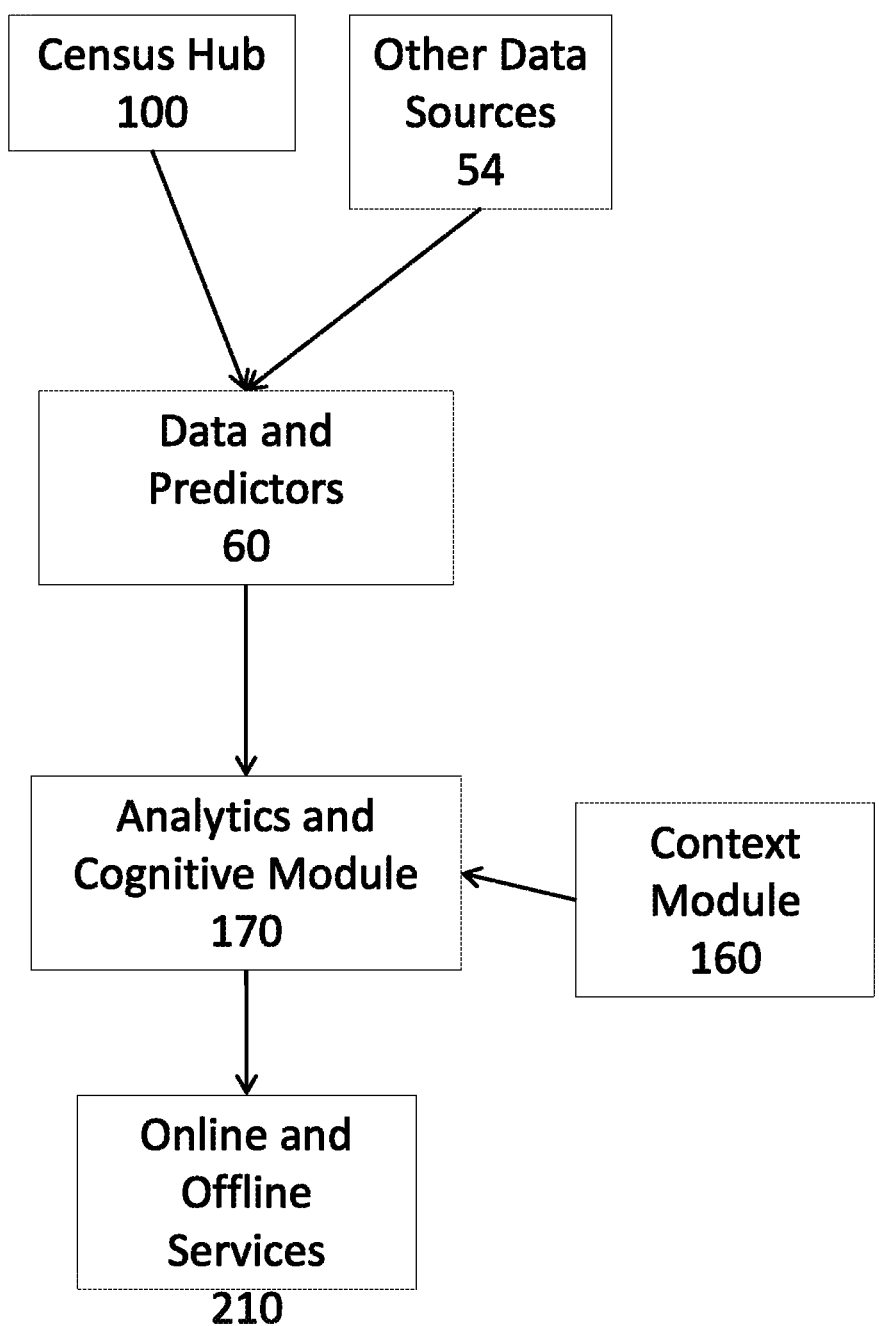
FIG. 3 provides a flowchart including operations and components providing output from a census hub according to an embodiment of the disclosure.

Referring to FIG. 3, further connectivity involving census hub 100 is provided. Census hub 100 and other data sources 54 provide data to a data and predictors component 60. The other data sources 54 may include data such as weather forecasts, health behaviour and other health data, student attendance data from manual-entry sources, teacher attendance data, resources available (e.g., resources per student per school), parent payment behaviour, and the like. All such data, including data from census hub 100, feeds into the data and predictors component that may include a wide variety of measures/factors, such as a student enrolment and alignment measure, student-teacher allocation measure, student resource measure, school resource affinity measure, and parent income measure. Such measures are, in embodiments, analyses and calculated factors that derive from the data obtained and/or stored in the census hub or from other sources. The data and predictors 60 pass data to analytics and cognitive module 170. This module comprises various modules, such as for example, attendance prediction, school profiling, fraud detection, and school resource estimation. Context module 160 also provides information to the analytics and cognitive module 170 in order to help improve the accuracy and relevancy of the calculations. The output of the analytics and cognitive module 170 is sent to users via online and offline services 210. These may be displayed on user devices or otherwise used in further downstream analyses.

Figure 4:
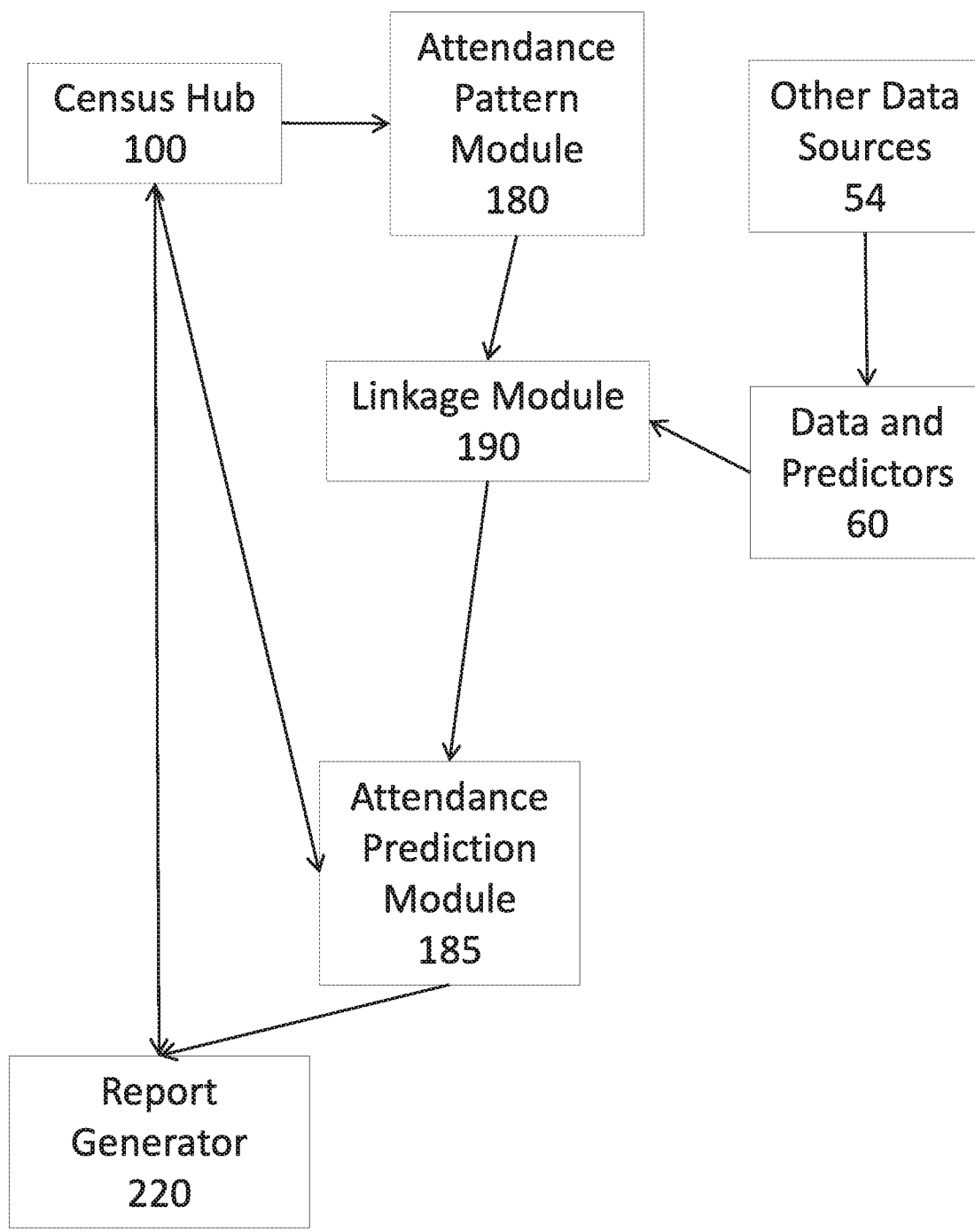
FIG. 4 provides a flowchart including operations and components involved in generating output reports according to an embodiment of the disclosure.

Referring to FIG. 4, further connectivity involving census hub 100 is provided. Census hub 100 gets an attendance pattern for a population of students from attendance pattern module 180. In addition, other data sources 54 provide data to the data and predictors component 60. Data from the data and predictors module 60 may include, as mentioned herein, teacher-attendance measures, school-resource measures, weather pattern measures, health pattern measures, and external event measures, and the like. (Collectively these may be referred to as "predictors".) Such measures may be appropriately weighted if certain factors are more relevant than other factors in downstream calculations and predictions. Data from the attendance pattern module 180 and from the data and predictors module 60 are provide to a linkages module 190, which module ensures that proper linkages are made between recorded attendance, attendance models, predictors, and other sources of data. The linkages so formed are provided to attendance prediction module 185. Attendance prediction module uses analytics, calculations, and the like in order to generate attendance patterns or other predictions. Such predictions may be for an individual student, class, school, or the like, or combinations thereof. The output of attendance prediction module 185 is provided to report generator 220, which then formats the predictions and models such that they can be delivered to the user in an appropriate format such as a report.

Figure 5:
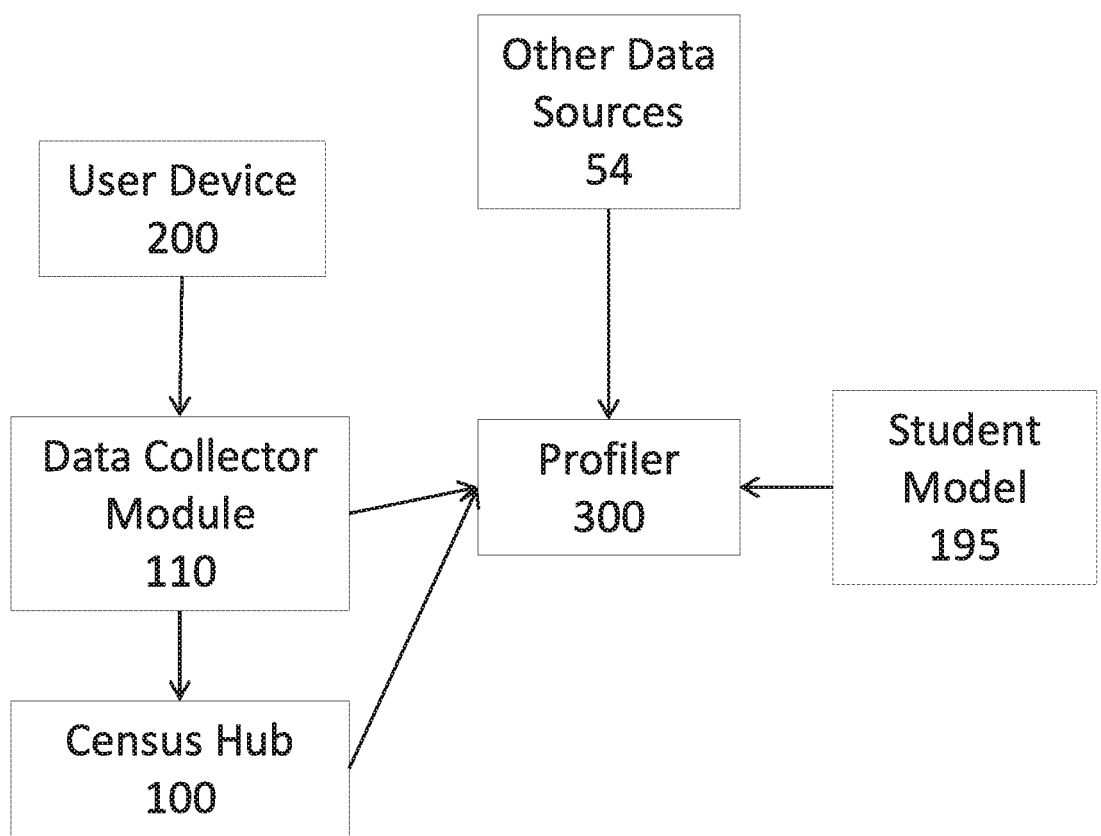
FIG. 5 provides a flowchart including operations and components involving a profiler according to an embodiment of the disclosure.
Figure 6:
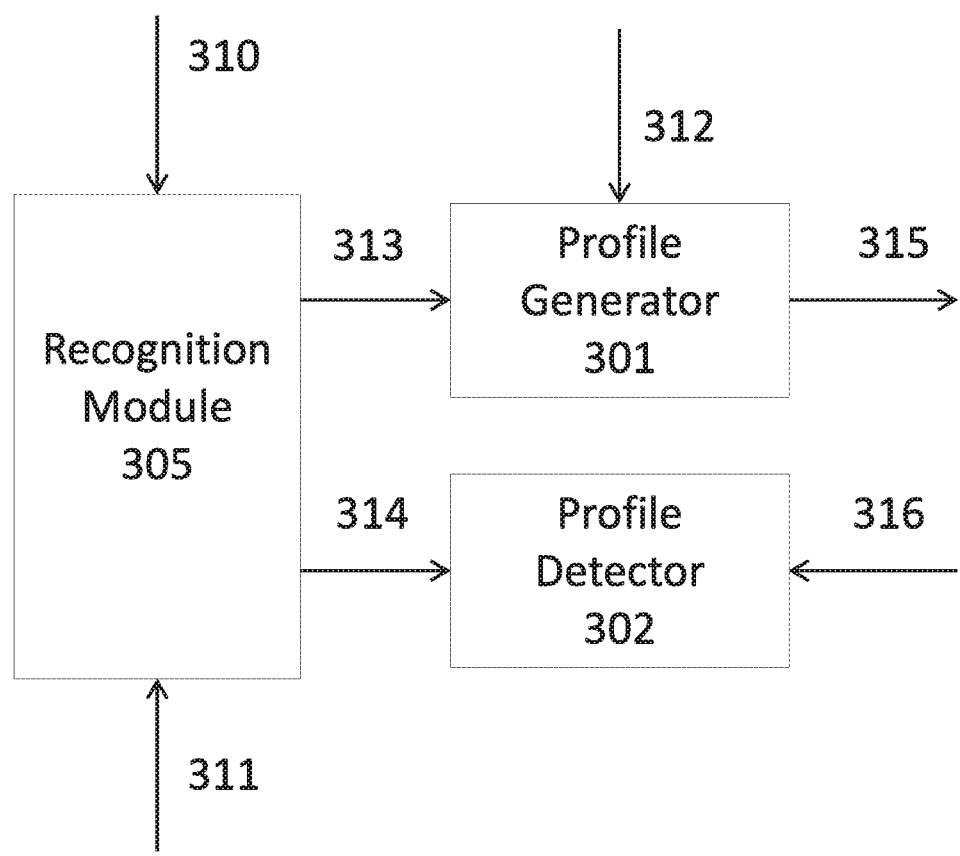
FIG. 6 provides a flowchart including data input and output from a profiler according to an embodiment of the disclosure.

Referring to FIG. 5 and FIG. 6, a fraud detection example is provided. User device 200 is used as described herein to provide data to the data collector module 110, which is in communication with census hub 100. The data collector module 110 and census hub 100 are further in communication with a profiler 300. Profiler 300 further receives data from other data sources 54 such as those described herein. Profiler 300 further receives data from Student Model 195, including such data as time-series-location data, and the like. Census hub 100 may have image logs linked with grades, classes, schools, districts, or the country, or the like. Such data may be further updated and augmented by data from user device 200. In order to accurately determine fraud, Profiler 300 then carries out two phases: a student profile generation phase and a student profile matching phase. Profiler 300 therefore comprises Profile Generator 301 and Profile Detector 302, which are in turn connected and receiving data from a hybrid Recognition Module 305. Recognition Module 305 receives data (310) from the census hub and receives data (311) from the data collector module. Recognition Module 305 identifies individual students from various data such as image recognition, biometric identifiers, and other possible sources. Such information is passed (313) to Profile Generator 301 and also passed (314) to Profile Detector 302. Profiler Generator 301 also receives (312) data from the census hub and from other data sources. Profile generator outputs (315) data to the student model (195) and Profile Detector 302 receives data from the student model (195). All of this data is compared and analysed in order to identify fraudulent attendance data.

For example, the Profile Generator (which also may be referred to as a profile generator module) further receives data from the census hub and observes a student attendance behaviour in terms of, e.g. attendance variation of time period. Given the time series sequences resulting from loading a set of observed attendance log, the Profile Generator automatically builds patterns. These patterns are sufficiently generic so as to match other attendance patterns, which contain signs of the same type of absenteeism. This can be done, by constructing a stochastically compact representation of all the possible sequences originated from same census data. For example, patterns/sequences can be encoded as Hidden Markov Model, which builds a statistical model of the observed activity by assuming that such activity is generated by a Markov process with unobservable states. We can treat HMMs as fraud signatures to be consumed by Profile Detector Module. That is, sequences that match against the HMMs generated by Profile Generator module can be considered fraud.

Throughout the figures and this disclosure, census hub may be augmented with all manners of data, metadata, inter-linkages with other databases, and the like. It will be appreciated that additional data, linkages, and models will improve the usefulness and accuracy of the census hub.

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

In the figures, like-numbered items across different figures and within the same figure are intended to refer to the same component unless otherwise indicated.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

EXAMPLES

Attendance Pattern: For each student or group of students is generated attendance patterns from past class/school attendance record available in the CH and by using other data such as real-time environmental or contextual data.

Generate Predictors: From data-sources, attendance indicators and their relationships are identified. Attendance indicators include teacher-attendance identifier, weather-pattern indictor, heath-pattern indictor, school-resource affinity, external event identifier, etc.

Define interaction terms to represent the relationship between multiple predictors. For each predictor, define a predictor specification to verify that whether a single student attendance data associated with the predictor is transformed. This can be generalized for group of students attendance based on the similarity of students attendance pattern.

Determine coefficient values (i.e., weight) for each predictors using logistic regression (or any other technique). Use the coefficient values for the selected predictors to create a component model (for student attendance) to assess the selected component of student attendance or group of student attendance. From the plurality of predictors that are associated with the selected component, select attendance predictors. The predicted attendance takes as input (i) weighted attendance patterns, and (ii) meta data for a user. Subsequently, a report is generated.

The invention claimed is:

1. A method comprising the steps of:
receiving, by a computer system via a network, one or more sensor signals that represent attendee information about one or more physical attributes of one or more students attending one or more schools remotely located with respect to the computer system, and storing the attendee information in an attendee data record in a database, wherein the attendee data record is dynamically annotated with predefined metadata values by an embedded unit;
receiving, by the computer system, one or more data signals from one or more secondary data sources and storing non-census data determined from the data signals in one or more non-census data records;
correlating the non-census data records with the attendee data records to create a census hub, the correlation using one or more of a time factor, a location factor, and an identity factor;
generating an attendance forecast for the school based on the correlated non-census data records and the attendee data records for one or more groups of students in one or more of the schools, the attendance forecast including past events and future predictions over a time scale; and
generating one or more notifications based on the attendance forecast that include a requisition order to a supplier and a public notice to enable transparent allocation and distribution of a resource, wherein any allocation and distribution based on fraudulent attendance data is detected based on profiles being defined by the identity factors for the students attending the school, the school being defined by the location factor, and the time attended being defined by the time factor, respectively.

2. The method of claim 1, further comprising the step of generating an attendance model based on the correlated non-census data records and the attendee data records, and wherein the attendance forecast is part of the attendance model.

3. The method of claim 1, wherein the census hub is a database structured to store historical census data from a plurality of schools, and further comprising generating an attendance model, wherein the attendance forecast is part of the attendance model.

4. The method of claim 1, wherein the secondary data source is one or more of the following: a sensor, a social media network, a website, a manual input device, and a secondary database.

5. The method of claim 1, wherein a secondary data is selected from one or more of the following: a weather report, a website usage report, a health report, an attendance report, an audio recording, and a news report.

6. The method of claim 1, wherein the identity factor is obtained from one or more of the following sensors: a camera, a fingerprint reader, an identification (ID) scanner, a Radio Frequency ID (RFID) reader, an image, a photograph, an ID number, and a biometric indicator.

7. The method of claim 1, where the metadata includes at least one local weather factors including one or more of a temperature, a humidity, and a barometric pressure.

8. The method of claim 1, further comprising the step of receiving, by the computer system, one or more data signals representing a tertiary non-census data from one or more tertiary data sources, the tertiary data being specific to one of the schools.

9. The method of claim 8, where the tertiary non-census data includes one or more of: one or more resources available at a school, one or more resources available per student, an historical school profile data, performance data of a school, performance data for one or more students at that school, historical fraud data, a neighborhood statistic, and time data for the foregoing.

10. A networked census system comprising:
a server comprising one or more computer processors and one or more memories coupled to the processor; and
a networked set of attendance census gathering sensors,
wherein each attendance census gathering sensor in the set of attendance census gathering sensors is in data communication with the server, and wherein the memory is configured to store program instructions executable by the processor to cause the server to perform the following:
receiving via the network, one or more sensor signals that represent attendee information about one or more physical attributes of one or more students attending one or more schools remotely located with respect to the system, and storing the attendee information in an attendee data record in a database;
receiving one or more data signals from one or more secondary data sources and storing non-census data determined from the data signals in one or more non-census data records;
correlating the non-census data records with the attendee data records to create a census hub, the correlation using one or more of a time factor, a location factor, and an identity factor;
generating an attendance model for the one or more of the schools based on the correlated non-census data records and the attendee data records in the census hub,
based on the attendance model, generating an attendance forecast for each of the schools based on the correlated non-census data records and the attendee data records for one or more groups of students in one or more schools, the attendance forecast including past events and future predictions over a time scale; and
generating one or more notifications based on the attendance forecast that include a requisition order to a supplier and a public notice to enable transparent allocation and distribution of a resource, wherein any allocation and distribution based on fraudulent attendance data is detected based on profiles being defined by the identity factors for the students attending the school, the school being defined by the location factor, and the time attended being defined by the time factor, respectively.

11. The system of claim 10, wherein the processor is configured to receive a request from a user and provide an output based on the request and the attendance model.

12. The system of claim 10, wherein the notification is an alert transmitted via the network to notify one or more remote users of resources that are needed at one or more of the schools.

13. The system of claim 10, wherein the notification is a requisition order transmitted via the network to requisition resources needed at one or more of the schools.

14. The system, as in claim 13, where the resources include one or more of the following: electrical power and water.

15. The system, as in claim 10, where the notification is sent from an interactive platform.

16. The system, as in claim 10, where the notification is a requisition for a resource.

17. The system, as in claim 16, where the resource is one or more of food, water, books, and school supplies.

18. The system, as in claim 16, where the notification is sent directly to a resource provider.

19. The system, as in claim 10, where the notification is sent as a forecast of change in attendance from the attendance model due to a resource availability.

20. The system, as in claim 19, where the attendance model uses one or more tertiary non-census data to make the forecast, the tertiary non-census data including one or more of: one or more resources available at a school, one or more resources available per student, an historical school profile data, performance data of a school, performance data for one or more students at that school, historical fraud data, neighbourhood statistics, and time data for the foregoing.

* * * * *